(12) United States Patent
Beale et al.

(10) Patent No.: US 11,497,062 B2
(45) Date of Patent: *Nov. 8, 2022

(54) WIRELESS TELECOMMUNICATIONS APPARATUS AND METHODS

(71) Applicant: Sony Corporation, Tokyo (JP)

(72) Inventors: Martin Warwick Beale, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,442

(22) Filed: Feb. 19, 2021

(65) Prior Publication Data

US 2021/0176795 A1    Jun. 10, 2021

Related U.S. Application Data

(63) Continuation of application No. 16/091,182, filed as application No. PCT/EP2017/057990 on Apr. 4, 2017, now Pat. No. 10,932,297.

(30) Foreign Application Priority Data

Apr. 5, 2016 (EP) .................................. 16163808

(51) Int. Cl.
  *H04W 74/08*   (2009.01)
  *H04W 76/27*   (2018.01)
  *H04W 74/00*   (2009.01)
(52) U.S. Cl.
  CPC ..... *H04W 74/0833* (2013.01); *H04W 74/004* (2013.01); *H04W 76/27* (2018.02)
(58) Field of Classification Search
  None
  See application file for complete search history.

(56) References Cited

U.S. PATENT DOCUMENTS

| 8,462,688 B1 | 6/2013 | Dinan |
| 2008/0130588 A1 | 6/2008 | Jeong et al. |

(Continued)

FOREIGN PATENT DOCUMENTS

| EP | 2 182 328 A1 | 5/2010 |
| GB | 2489690 A | 10/2012 |
| WO | 2015/085460 A1 | 6/2015 |

OTHER PUBLICATIONS

ETSI Technical Specification, "Digital cellular telecommunications system (Phase 2+); Universal Mobile Telecommunications System (UMTS); LTE; Service requirements for Machine-Type Communications (MTG); Stage 1," ETSI TS 122 368 V12.4.0 (Oct. 2014), 3GPP TS 22.368 version 12.4.0 Release 12, Oct. 2014, pp. 1-23.

(Continued)

*Primary Examiner* — Jamaal Henson
(74) *Attorney, Agent, or Firm* — Xsensus LLP

(57) ABSTRACT

A method of operating a terminal device in a wireless telecommunications network comprising the terminal device and a base station. The wireless telecommunications network supports a random access procedure comprising an exchange of random access procedure messages between the terminal device and the base station. At least one of the random access procedure messages is a variable size uplink message. The method comprises: receiving from the base station an instruction to perform the random access procedure, wherein the instruction to perform the random access procedure comprises an indication of a message size to be used by the terminal device for the variable size uplink message during the random access procedure; and performing the random access procedure by exchanging random access procedure messages with the base station, including transmitting the uplink message of variable size with a size (Continued)

corresponding to the indicated message size received from the base station.

20 Claims, 4 Drawing Sheets

(56) References Cited

U.S. PATENT DOCUMENTS

| | | | |
|---|---|---|---|
| 2008/0214193 A1 | 9/2008 | Jeong et al. | |
| 2009/0259910 A1* | 10/2009 | Lee | H04W 74/0833 714/748 |
| 2010/0111032 A1 | 5/2010 | Wu | |
| 2011/0249641 A1 | 10/2011 | Kwon et al. | |
| 2011/0274040 A1 | 11/2011 | Pani et al. | |
| 2012/0127930 A1* | 5/2012 | Nguyen | H04W 74/002 370/329 |
| 2013/0034059 A1 | 2/2013 | Lee et al. | |
| 2013/0077569 A1 | 3/2013 | Nam et al. | |
| 2013/0188612 A1 | 7/2013 | Dinan | |
| 2015/0249564 A1 | 9/2015 | Kim et al. | |
| 2016/0150573 A1 | 5/2016 | Pani et al. | |
| 2016/0255616 A1 | 9/2016 | Martin et al. | |
| 2016/0262182 A1* | 9/2016 | Yang | H04L 1/1854 |
| 2016/0302080 A1* | 10/2016 | Hwang | H04W 74/08 |
| 2017/0273108 A1* | 9/2017 | Damnjanovic | H04W 74/085 |
| 2019/0104551 A1* | 4/2019 | Deenoo | H04W 76/28 |

OTHER PUBLICATIONS

ETSI Technical Specification, "Evolved Universal Terrestrial Radio Access (E-UTRA); Physical layer procedures," ETSI TS 136 213 V13.0.0 (Jan. 2016), 3GPP TS 36.213 version 13.0.0 Release 13, Jan. 2016, pp. 1-328.

Holma, H. and Toskala, A., "LTE for UMTS: OFDMA and SC-FDMA Based Radio Access," First published: Mar. 31, 2009, Copyright © 2009 John Wiley & Sons, Ltd, Print ISBN: 9780470994016, pp. 25-27.

NIT DOCOMO, Inc., "Support of different Msg.3 TBS for NB-IoT Ues," R2-162617, 3GPP TSG-RAN WG2 #93bis, Apr. 11-15, 2016, Dubrovnik, Croatia, pp. 1-3.

Texas Instruments, Inc., "Preamble group selection in the RACH procedure," R2-083252, 3GPP TSG-RAN WG2 Meeting #62bis, Warsaw, Poland, Jun. 30-Jul. 4, 2008, pp. 1-4.

International Search Report and Written Opinion for International Application No. PCT/EP2017/057990 dated Jul. 3, 2017.

* cited by examiner

WIRELESS TELECOMMUNICATIONS APPARATUS AND METHODS

CROSS-REFERENCE TO RELATED APPLICATIONS

The present application is a continuation of U.S. application Ser. No. 16/091,182, filed Oct. 4, 2018, which is based on PCT filing PCT/EP2017/057990, filed Apr. 4, 2017, which claims priority to EP 16163808.5, filed Apr. 5, 2016, the entire contents of each are incorporated herein by reference.

BACKGROUND

Field

The present disclosure relates to wireless telecommunications apparatus and methods.

Description of Related Art

The 'background' description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architectures, are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage areas for these networks is expected to increase rapidly.

The anticipated widespread deployment of third and fourth generation networks has led to the parallel development of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Further information on characteristics of MTC-type devices can be found, for example, in the corresponding standards, such as ETSI TS 122 368 V12.4.0 (2014-10)/3GPP TS 22.368 version 12.4.0 Release 12 [1]. Some typical characteristics of MTC type terminal devices/MTC type data might include, for example, characteristics such as low mobility, high delay tolerance, small data transmissions, a level of predictability for traffic usage and timing (i.e. traffic profile), relatively infrequent transmissions and group-based features, policing and addressing.

A current technical area of interest to those working in the field of wireless and mobile communications is known as "The Internet of Things", or IoT for short. The 3GPP has proposed to develop technologies for supporting narrow band (NB)-IoT using an LTE/4G wireless access interface and wireless infrastructure. Such IoT devices are expected to often be low complexity and inexpensive devices requiring infrequent communication of relatively low bandwidth data (e.g. MTC devices).

The increasing use of different types of terminal devices associated with different traffic profiles gives rise to new considerations for efficiently handling signalling associated with such devices. This is because approaches for efficiently handling transmissions associated with one traffic profile, e.g. frequent transmissions of large volumes of data, may be different from approaches for efficiently handling transmissions associated with another traffic profile, e.g. infrequent transmissions of small amounts of data.

In view of this there is a need for methods and apparatus that can help provide for increased flexibility in respect of the signalling used for data transmissions in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
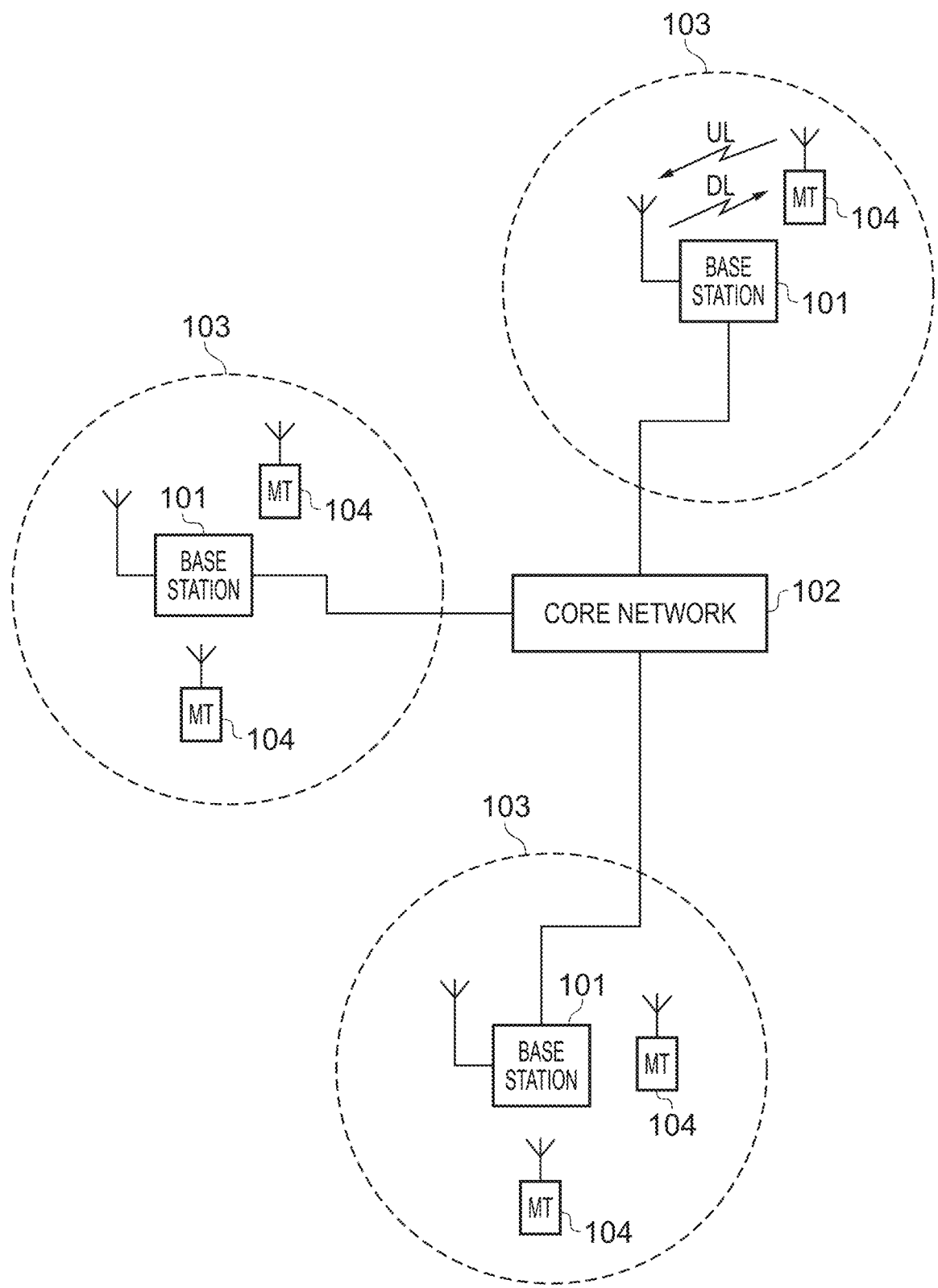
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating in accordance with LTE principles and which may implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

In addition to a terminal device deciding itself to initiate a random access procedure to connect to the network, it is also possible for the network, e.g. a base station, to instruct a terminal device in connected mode to initiate a random access procedure by transmitting to the terminal device an instruction to do so. Such an instruction is sometimes referred to as a PDCCH order (Physical Downlink Control Channel order), see, for example, Section 5.3.3.1.3 in ETSI TS 136 213 V13.0.0 (2016-01)/3GPP TS 36.212 version 13.0.0 Release 13 [3].

There are various scenarios in which a network triggered RACH procedure (PDCCH order) may arise. For example:
a terminal device may receive a PDCCH order to transmit on PRACH as part of a handover procedure
a terminal device that is RRC connected to a base station but has not exchanged data with the base station for a relatively long time may receive a PDCCH order to cause the terminal device to transmit a PRACH preamble so that it can be re-synchronised to the network and allow the base station to correct timings for the terminal device
a terminal device may receive a PDCCH order so that it can establish a different RRC configuration in the subsequent RACH procedure, this may apply, for example, for a narrowband IoT terminal device which is prevented from RRC reconfiguration in connected mode whereby sending the terminal device to idle mode through a PDCCH order allows the terminal device to be configured in the subsequent PRACH procedure, for example to configure the terminal device for a different coverage enhancement level (e.g. more or fewer repetitions)

For convenience, the term PDCCH order is used herein to refer to signalling transmitted by a base station to instruct a terminal device to initiate a PRACH procedure regardless of the cause. However, it will be appreciated such an instruction may in some cases be transmitted on other channels/in higher layers. For example, in respect of an intra-system handover procedure, what is referred to here as a PDCCH order may be an RRC Connection Reconfiguration instruction transmitted on a downlink shared channel/PDSCH.

When a PDCCH order is transmitted to a terminal device, the terminal device is assigned a PRACH preamble signature sequence to use for the subsequent PRACH procedure. This is different from a terminal device triggered PRACH procedure in which the terminal device selects a preamble from a predefined set and so could by coincidence select the same preamble as another terminal device PRACHing at the same time giving rise to potential contention. Consequently, for PRACH procedures initiated by a PDCCH order there is less chance for contention with other terminal devices undertaking PRACH procedures at the same time because the PRACH preamble for the PDCCH ordered terminal device is scheduled by the network/base station.

Figure 2:
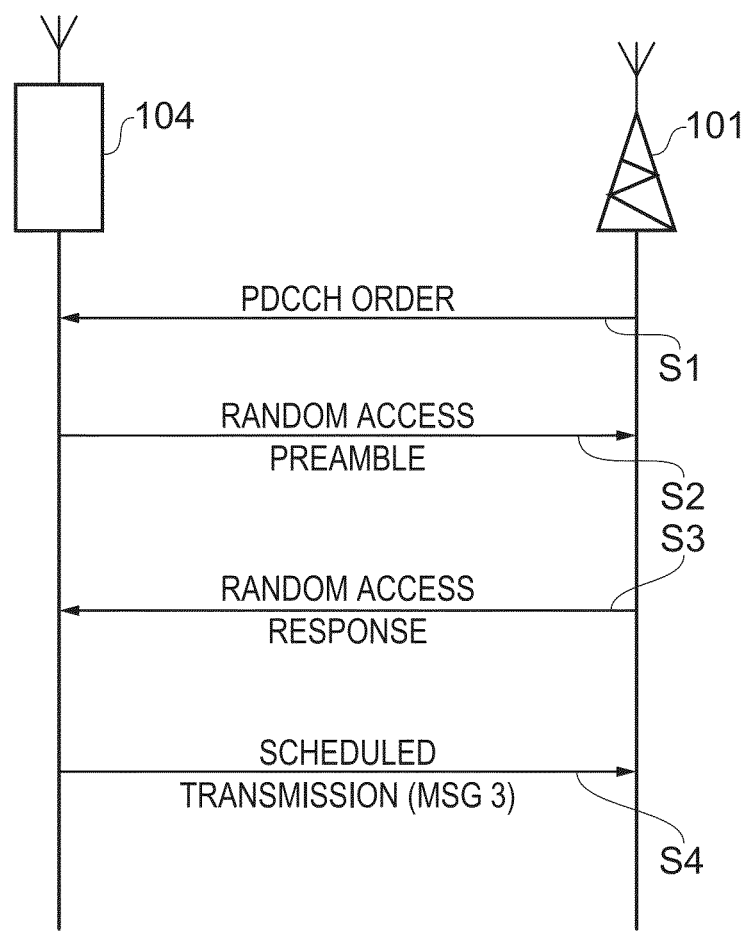
FIG. 2 schematically represents steps in a random access procedure in a wireless telecommunication network.

FIG. 2 is a ladder diagram schematically showing steps of a conventional LTE random access procedure undertaken by a terminal device 104 (left-hand node in FIG. 2) in response to a PDCCH order received from a base station 101 (right-hand node in FIG. 2). It will be appreciated the specific reason for undertaking the PDCCH ordered PRACH is not significant to the principles described herein.

In step S1 the base station 101 transmits signalling corresponding to a PDCCH order addressed to the terminal device 104. This signalling includes an indication of a random access preamble signature sequence for the terminal device to use for the subsequent random access procedure. This preamble may be selected by the base station from a pool of preambles that are not available for contention-based (terminal device triggered) random access procedures to avoid contention.

In step S2 the terminal device 104 transmits the preamble indicated in association with the signalling received in Step S1 on a physical random access channel (PRACH). Based on the radio resources used for the uplink transmission of the preamble, the terminal device determines a RA-RNTI (Random Access Radio Network Temporary Identity) associated with the transmission.

In step S3, on receiving the transmission of the random access preamble from the terminal device in step S2, the base station 101 transmits a Random Access Response (RAR) message addressed to the RA-RNTI. The RAR message contains an indication of the preamble, a timing alignment command and a temporary C-RNTI (Cell Radio Network Temporary Identity) as well as an indication (allocation/grant) of uplink resources to be used by the terminal device for the next step of the procedure.

In step S4, assuming the terminal device receives the RAR of step S3 from the base station within a specified time window after preamble transmission in step S2, the terminal device transmits a so-called Message 3 using the uplink radio resources indicated in association with the RAR message received in step S3. Message 3 conveys the appropriate higher-layer message associated with the PRACH procedure. For example, the higher-layer message might be an RRC Connection Resume message, an RRC Connection Reconfiguration Complete message, an RRC Connection Re-establishment Request message or an Uplink Information Transfer message.

For a conventional wireless telecommunications system. Message 3 exchanged in step S4 of the processing represented in FIG. 2 would normally be expected to have a fixed size/length (if the information to be conveyed is less than the fixed size, padding is used to provide the fixed size). However, it has been proposed that in some situations it may be advantageous for Message 3 to have a variable length so that it can be used by the terminal device to communicate additional information to that which is normally associated with a conventional Message 3. That is to say, it has been proposed that a terminal device may be able to "piggy back" certain data, for example user plane data, on Message 3 transmissions of a random access procedure. For example, this may be particularly advantageous in respect of terminal devices needing to transmit relatively small amounts of data since this data may be transmitted in association with a random access procedure Message 3, thereby saving signalling overhead associated with establishing a separate uplink transmission for this data.

Accordingly, it is possible that a base station may need to allocate different amounts of uplink radio resources to use for different Message 3 transmissions depending on the amount data to be transmitted in the Message 3. That is to say, in some implementations uplink signalling associated with a random access procedure may have a variable size. To accommodate this it has been proposed that the size of Message 3 be indicated in the random access response, RAR transmitted from the base station to the terminal device in response to the base station receiving the random access preamble from the terminal device. However, the inventors have recognised certain drawbacks with this approach. For example, RAR messages will be transmitted frequently in wireless telecommunication systems, for example in respect of all contention and non-contention-based random access procedures, and so it would be preferable for these messages to be as simple and straightforward as possible, for example it would be preferable to support a single format for the RAR message, for both contention and non-contention based access.

Figure 3:
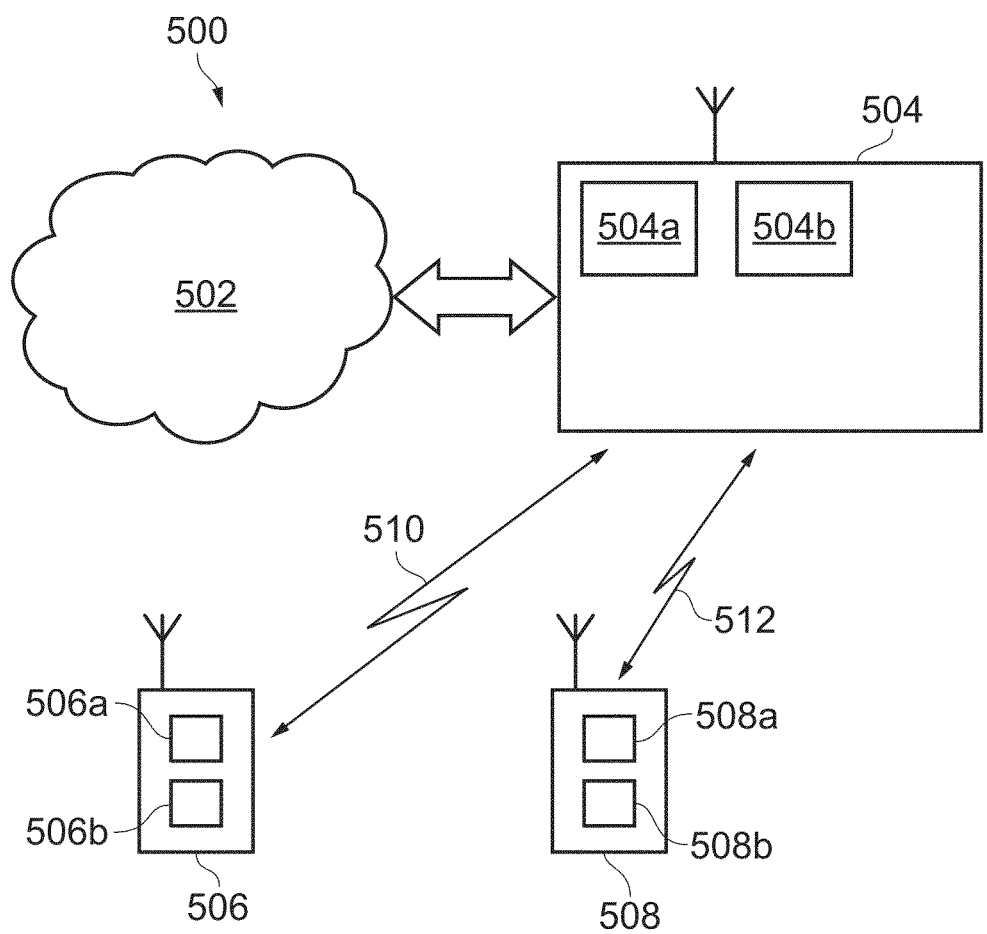
FIG. 3 schematically represents some aspects of a wireless telecommunications network configured to operate in accordance with certain embodiments of the present disclosure.

FIG. 3 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 3 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 3 may be broadly conventional apart from where modified to provide functionality in accordance with embodiments of the present disclosure as discussed herein.

In this example, it is assumed the first terminal device 506 is a conventional smartphone-type terminal device communicating with the base station 504 in a conventional manner. This conventional terminal device 506 comprises a transceiver unit 506a for transmission and reception of wireless signals and a processor unit 506b configured to control the device 506. The processor unit 506b may comprise a processor unit which is suitably configured/programmed to provide the desired functionality using conventional programming/configuration techniques for equipment in wireless telecommunications systems. The transceiver unit 506a and the processor unit 506b are schematically shown in FIG. 3 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 506 will in general comprise various other elements associated with its operating functionality.

In this example, it is assumed the second terminal device 508 is a machine-type communication (MTC) terminal device 508 adapted to support operations in an Internet of Things (IoT) context in accordance with embodiments of the present disclosure when communicating with the base stations 504. In this regard, the terminal device 508 may be a reduced capability terminal device, for example a terminal device able to operate on a restricted bandwidth as compared to conventional terminal devices (i.e. what might be referred to as a narrowband device). However, it will be appreciated this represents merely one specific implementation of approaches in accordance with embodiments of the disclosure, and in other cases, the same principles may be applied in respect of terminal devices which are not reduced capability terminal devices, but may comprise conventional smartphone terminal devices, or indeed any other form of terminal device, that may be operating in a wireless telecommunications system (e.g. the smartphone terminal device 506 may in other cases also implement the functionality described herein for the reduced-capability terminal device 508 in accordance with embodiments of the disclosure).

The IoT terminal device 508 comprises a transceiver unit 508A for transmission and reception of wireless signals and a processor unit 508B configured to control the terminal device 508. The processor unit 508B may comprise various sub-units for providing functionality in accordance with embodiments of the present disclosure as explained further herein. These sub-units may be implemented as discrete hardware elements or as appropriately configured functions of the processor unit. Thus the processor unit 508B may comprise a processor unit which is suitably configured/programmed to provide the desired functionality described herein using conventional programming/configuration techniques for equipment in wireless telecommunications systems. The transceiver unit 508A and the processor unit 508B are schematically shown in FIG. 3 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 508 will in general comprise various other elements associated with its operating functionality, for example a power source, user interface, and so forth, but these are not shown in FIG. 2 in the interests of simplicity.

The base station 504 comprises a transceiver unit 504a for transmission and reception of wireless signals and a processor unit 504b configured to control the base station 504 to operate in accordance with embodiments of the present disclosure as described herein. The processor unit 506b may again comprise various sub-units, such as a scheduling unit, for providing functionality in accordance with embodiments of the present disclosure as explained further below. These sub-units may be implemented as discrete hardware elements or as appropriately configured functions of the processor unit. Thus, the processor unit 504b may comprise a processor unit which is suitably configured/programmed to provide the desired functionality described herein using conventional programming/configuration techniques for equipment in wireless telecommunications systems. The transceiver unit 504a and the processor unit 504b are schematically shown in FIG. 3 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the base station 504 will in general comprise various other elements associated with its operating functionality.

Thus, the base station 504 is configured to communicate data with both the conventional smartphone terminal device 506 and the IoT terminal device 508 according to an embodiment of the disclosure over respective communication links 510, 512. The base station 504 is configured to communicate with the conventional terminal device 506 over the associated radio communication link 510 following the established principles of LTE-based communications, and in particular using conventional random access procedures such as represented in FIG. 2. However, communications between the base station 504 and the IoT terminal device 508 operate using modified random access procedures in accordance with certain embodiments of the present disclosure as described herein. Thus, one aspect of certain embodiments of the disclosure is that the base station is configured to operate by communicating with different classes of terminal device (e.g. a first class of terminal device, for example comprising conventional LTE terminal devices, such as smartphones, and a second class of terminal device, for example comprising IoT-type terminal devices) using different random access procedures. That is to say, a base station may operate to communicate with a first class (group/type) of terminal device using a first random access procedure (e.g. in accordance with conventional and established random access procedures) and to communicate with a second class (group/type) of terminal device using a modified random access procedure, such as described herein. Whether or not a particular terminal device or base station supports modified random access procedures in accordance with embodiments of the present disclosure may be established in accordance with conventional techniques for sharing terminal device and base station capability information in wireless telecommunications networks, for example based on signalling exchange during a RRC connection establishment procedure or based on the ability of a terminal device to decode a particular synchronisation signal or system information message. However, it will be appreciated that while in some implementations modified random access procedures may be used in respect of only certain types of terminal device, in other implementations the same modified procedures may be used in a wireless telecommunications system in respect of all terminal devices.

Figure 4:
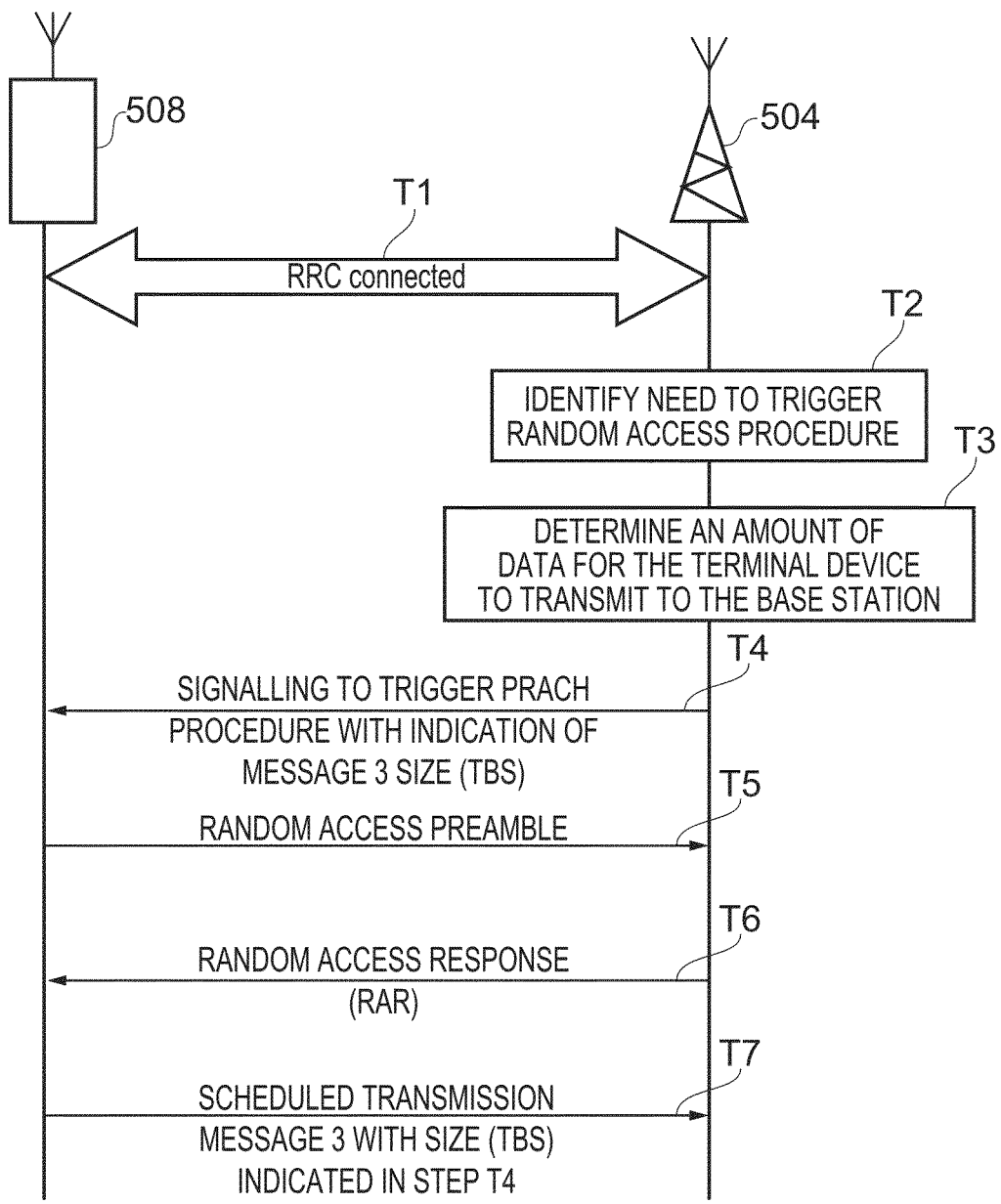
FIG. 4 is a ladder signalling diagram schematically representing some operating aspects of terminal devices and base stations associated with random access procedures in accordance with certain embodiments of the present disclosure.

FIG. 4 is a ladder diagram schematically showing steps of a modified random access procedure undertaken by the terminal device 508 (left-hand node in FIG. 4) and the base station 504 (right-hand node in FIG. 4) represented in FIG. 3 in accordance with certain embodiments of the disclosure. As already mentioned, it will be appreciated aspects of this operation which are not specifically described herein, for example the particular signalling protocols adopted, may be implemented in accordance with conventional techniques for communicating in wireless telecommunications systems. It will further be appreciated the process of FIG. 4 is closely based on the conventional process of FIG. 2 and aspects of FIG. 4 which correspond with aspects of FIG. 2 are not discussed in detail in the interests of brevity.

In step T1 of the signalling represented in FIG. 4 it is assumed the terminal device 508 is operating in an RRC connected mode with respect to the base station 504 in accordance with conventional techniques. It will be appreciated the reason why the terminal device is RRC connected to the base station and the contents of any data being exchanged between the terminal device and the base station is not significant to the principles described herein.

In step T2 the base station 504 identifies a need to trigger the terminal device 508 to undergo a random access procedure. The specific reason why the base station determines the terminal device should undergo a random access procedure is not significant to the principles described herein. However, for the sake of a concrete example, it is assumed here the terminal device is unable to reconfigure its RRC connection whilst RRC connected, for example as has been suggested for IoT type terminal devices, but the base station determines the current RRC configuration settings for the terminal device are not appropriate. For example, the base station may recognise the terminal device needs to be reconfigured to change its coverage enhancement settings, for example by increasing the number of repetitions associated with coverage enhancement functions applied for the terminal device. This may be the case, for example, because the base station recognises the current RRC configuration does not provide sufficient coverage enhancement to allow for the reliable exchange of data between the base station and the terminal device.

In step T3, the base station determines an amount of data for the terminal device to transmit to the base station in association with uplink signalling for the random access procedure that will result from step T2. That is to say, the random access procedure is configured to allow for a variable size message 3, and prior to triggering the random access procedure, the base station determines a length/size (i.e. a transport block size, TBS) of a message 3 uplink transmission associated with the yet-to-be triggered random access procedure. For example, the base station may be aware of how much uplink data is being buffered by the terminal device from buffer status information received from the terminal device in association with step T1. The base station may thus be aware that the terminal device has N bits of uplink data to transmit, and decides the amount of this data that should be transmitted by the terminal device in uplink signalling associated with the random access procedure. The actual amount of data to be transmitted by the terminal device in the PRACH procedure, e.g. the TBS for message 3, may be determined by the base station in step T3 having regard to the generally established principles for scheduling transmissions in wireless telecommunication systems.

In step T4 the base station 504 transmits signalling to the terminal device 508 to instruct the terminal device to initiate a PRACH procedure. This signalling may be based on a conventional PDCCH order, for example as discussed above with reference to step S1 of FIG. 2, but modified to additionally provide the terminal device with an indication of the amount of data for the terminal device to transmit to the base station in uplink signalling associated with the random access procedure. That is to say, the signalling of step T4 may provide the terminal device 508 with an indication of a transport block size (as determined by the base station in step T3) to be used for message 3 in the random access procedure triggered by the signalling of step T4. For example, the indication of the transport block size to use for Message 3 could be conveyed in a bit field within the Downlink Control Information (DCI) carried by the PDCCH. There are various different ways in which the base station may convey an indication of the transport block size to be used in association with random access procedure uplink signalling, as discussed further below. It will be appreciated that whilst the signalling of step T4 may in some cases correspond with a modified PDCCH order, in other implementations different forms of signalling may be adopted, for example the information conveyed in step T4 of FIG. 4 may be conveyed by higher layer signalling, such as an RRC message.

In step T5 the terminal device 508 responds to the instruction to initiate a random access procedure received in step T4 by initiating the random access procedure through transmission of a random access preamble to the base station. This step may be performed in accordance with conventional random access procedures, for example the step may correspond with step S2 discussed above with reference to FIG. 2. Accordingly, and as is conventional, the random access preamble signature sequence used by the terminal device for the transmission in step T5 may be based on an indication received from the base station in association with the instruction to initiate the random access procedure received in step T4 to help avoid contention.

In step T6, after receiving the random access preamble from the terminal device in step T5, the station responds with a random access response message (RAR). The RAR may be conventional, for example, and correspond with the random access response message discussed above in relation to step S3 of FIG. 2.

In step T7, on receiving the RAR message of step T6, the terminal device proceeds to transmit a random access procedure message 3 with a transport block size corresponding to the size indicated in the signalling received from the base station providing an instruction to trigger the random access procedure in step T4. The actual data transmitted by the terminal device in this variable size message 3 will depend on the implementation at hand and is not significant to the principles described herein. For example, the terminal device may transmit an amount of user plane data in its uplink buffer in conjunction with an otherwise conventional random access message 3, wherein the amount of data transmitted is based on the indicated transport block size received from the base station in the instruction to initiate the random access procedure in step T4.

Thus, in accordance with the principles described above, a variable size message 3 can be used to allow a terminal device to transmit different amounts of data in uplink signalling associated with a random access procedure, and furthermore, this is achieved in a way which does not require a modified random access response message. Instead, the terminal device is provided with an indication of the transport block size for the uplink signalling associated with the random access procedure (in this example message 3 signalling) in conjunction with a previously received instruction to initiate a random access procedure received from the base station (step T4 in this example). This can simplify RAR decoding and reduce the number of bits that need to be transmitted in RAR messages.

As noted above there are various different ways in which the base station 504 may provide the terminal device 508 with an indication of the size, e.g. TBS, for subsequent uplink signalling associated with a random access procedure, e.g. a message 3, in association with an instruction for the terminal device to initiate a random access procedure, e.g. a PDCCH order or higher layer signalling.

As already discussed, the base station may in association with the trigger instruction to initiate the random access procedure (step T4 in the example of FIG. 4) also provide the terminal device with an indication of the random access preamble to use for the random access procedure. This is an established principle for network triggered (non-contention) random access procedures in wireless telecommunications systems. However, in accordance with certain embodiments of the present disclosure, the specific preamble chosen by the base station for the terminal device to use in the PRACH procedure may be used to provide an indication of a subsequent uplink message size. For example, in a simple implementation the wireless telecommunications system may allow two different sizes for message 3. In this case the preambles available for non-contention random access procedures may be divided into two groups, with one group associated with one length for message 3 and the other group associated with another length for message 3. The base station can therefore select from one or other group to provide the terminal device with an indication of the size of message 3 it should use in the subsequent random access procedure. Of course in any given implementation there may be more than two different message 3 sizes available, and correspondingly more than two predefined groups of random access preambles. The predefined associations between different preambles and message sizes may be provided in accordance with an operating standard for the wireless telecommunications systems, or may be configurable, for example through system information signalling. It may be noted in some scenarios for a contention based random access procedure a terminal device may itself be configured to select a preamble to provide an indication of an intended message 3 size based on a predefined association between different message 3 sizes and different preambles/preamble groups available for selection by the terminal device for contention-based random access.

In other examples the transport block size for the terminal device to use for subsequent uplink signalling associated with the random access procedure may be explicitly indicated in association with the signalling received from the base station to trigger the terminal device to initiate the random access procedure. For example, referring to FIG. 4, the signalling of step T4 may be associated with an explicit indication of the TBS to use. The explicit indication of the TBS could be transmitted within an information element of an RRC message or a bit field of Downlink Control Information (DCI) transmitted on a PDCCH.

In other examples a context/cause associated with the signalling to trigger PRACH (e.g. the PDCCH order) may implicitly indicate the transport block size to be used for message 3 in the PRACH procedure. For example, in accordance with a predefined association, an instruction to initiate a random access procedure in association with a handover operation may correspond with one TBS size, an instruction to initiate a random access procedure to achieve resynchronisation may be associated with another TBS size, and an instruction to initiate a random access procedure to achieve an RRC reconfiguration may be associated with yet another TBS size. A terminal device may be able to in effect determine the context of a PDCCH order from previous signalling characteristics. E.g. if the terminal device recognizes it has not had reliable communications during a preceding period, it may assume a PDCCH order is to reconfigure the device for a different repetition rate. If the terminal device recognizes it has not received downlink signalling for some time, it may assume a PDCCH order is to achieve resynchronisation.

In other examples the content of the instruction to initiate a random access procedure (e.g. a PDCCH order or higher-layer instruction) may provide an indication of the transport block size to use for subsequent uplink signalling associated with the random access procedure (e.g. a message 3 in an LTE context). For example, in the case of the random access trigger instruction from the base station being issued to allow for RRC reconfiguration, different RRC configurations may be associated with different message 3 sizes. Accordingly, the base station may provide an indication of a RRC configuration to be adopted in association with the signalling to trigger the terminal device to initiate the random access procedure, and this may indicate a particular message size for subsequent uplink signalling associated with the random access procedure in accordance with a predefined association/mapping.

Thus there has been described a method of operating a terminal device in a wireless telecommunications network comprising the terminal device and a base station. The wireless telecommunications network supports a random access procedure comprising an exchange of random access procedure messages between the terminal device and the base station. At least one of the random access procedure messages is a variable size uplink message. The method comprises: receiving from the base station an instruction to perform the random access procedure, wherein the instruction to perform the random access procedure is conveyed in association with an indication of a message size to be used by the terminal device for the variable size uplink message during the random access procedure; and performing the random access procedure by exchanging random access procedure messages with the base station, including transmitting the uplink message of variable size with a size corresponding to the indicated message size received from the base station.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

Further particular and preferred aspects of the present invention are set out in the accompanying independent and dependent claims. It will be appreciated that features of the dependent claims may be combined with features of the independent claims in combinations other than those explicitly set out in the claims.

It will further be appreciated that the principles described herein are not applicable only to LTE-based wireless telecommunications systems, but are applicable for any type of wireless telecommunications system that supports a random access procedure comprising an exchange of random access procedure messages between a terminal device and a base station where at least one of the random access procedure messages is a variable size uplink message.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

1. A method of operating a terminal device in a wireless telecommunications network comprising the terminal device and a base station, wherein the wireless telecommunications network supports a random access procedure comprising an exchange of random access procedure messages between the terminal device and the base station, wherein at least one of the random access procedure messages is a variable size uplink message; wherein the method comprises:
   receiving from the base station an instruction to perform the random access procedure, wherein the instruction to perform the random access procedure comprises an indication of a message size to be used by the terminal device for the variable size uplink message during the random access procedure; and
   performing the random access procedure by exchanging random access procedure messages with the base station, including transmitting the uplink message of variable size with a size corresponding to the indicated message size received from the base station.

2. The method of paragraph 1, wherein the indication of the message size to be used by the terminal device for the variable size uplink message is conveyed explicitly in information received from the base station in association with the instruction to perform the random access procedure.

3. The method of paragraph 1, wherein the instruction to perform the random access procedure is associated with an indication of a random access preamble signature sequence to be used by the terminal device in an uplink message to initiate the random access procedure, and wherein the indication of the message size to be used by the terminal device for the variable size uplink message is conveyed implicitly by the indicated random access preamble signature sequence, whereby different random access preamble signature sequences correspond with different sizes for the variable size message in accordance with a predefined association.

4. The method of paragraph 1, wherein the indication of the message size to be used by the terminal device for the variable size uplink message is conveyed implicitly by a context for performing the random access procedure, whereby different contexts for performing the random access procedure correspond with different sizes for the variable size message in accordance with a predefined association.

5. The method of paragraph 1, wherein the indication of the message size to be used by the terminal device for the variable size uplink message is conveyed implicitly by information content included in the instruction to perform the random access procedure to convey other information, whereby different information contents for the other information correspond with different sizes for the variable size message in accordance with a predefined association.

6. The method of paragraph 1, wherein the information content included in the instruction to perform the random access procedure to convey other information comprises an indication of a radio resource control configuration for the terminal device, whereby different radio resource control configurations correspond with different sizes for the variable size message in accordance with a predefined association.

7. The method of any of paragraphs 1 to 6, wherein the random access procedure messages comprise at least a first message, a second message, and a third message, wherein the first message comprises an uplink message conveying a random access preamble signature sequence from the terminal device to the base station to initiate the random access procedure, the second message is a downlink message transmitted in response to the first message and conveying an indication of an allocation of uplink radio resources to be used by the terminal for transmitting the third message, and the third message is the variable-size uplink message.

8. The method of any of paragraphs 1 to 7, wherein the indication of a message size to be used by the terminal device for the variable size uplink message during the random access procedure comprises an indication of a transport block size, TBS, to be used for the variable size uplink message during the random access procedure.

9. The method of any of paragraphs 1 to 8, wherein the instruction to initiate a random access procedure is received from the base station while the terminal device is in a radio resource control connected mode of operation with respect to the base station.

10. The method of any of paragraphs 1 to 9, wherein the instruction to initiate a random access procedure comprises a physical downlink control channel, PDCCH, order.

11. A terminal device for use in a wireless telecommunications network comprising the terminal device and a base station, wherein the wireless telecommunications network supports a random access procedure comprising an exchange of random access procedure messages between the terminal device and the base station, wherein at least one of the random access procedure messages is a variable size uplink message; wherein the terminal device comprises a controller unit and a transceiver unit configured such that the terminal device is operable to:
receive from the base station an instruction to perform the random access procedure, wherein the instruction to perform the random access procedure comprises an indication of a message size to be used by the terminal device for the variable size uplink message during the random access procedure; and
perform the random access procedure by exchanging random access procedure messages with the base station, including transmitting the uplink message of variable size with a size corresponding to the indicated message size received from the base station.

12. Integrated circuitry for a terminal device for use in a wireless telecommunications network comprising the terminal device and a base station, wherein the wireless telecommunications network supports a random access procedure comprising an exchange of random access procedure messages between the terminal device and the base station, wherein at least one of the random access procedure messages is a variable size uplink message, wherein the integrated circuitry comprises a controller element and a transceiver element configured to operate together such that the terminal device is operable to:
receive from the base station an instruction to perform the random access procedure, wherein the instruction to perform the random access procedure comprises an indication of a message size to be used by the terminal device for the variable size uplink message during the random access procedure; and
perform the random access procedure by exchanging random access procedure messages with the base station, including transmitting the uplink message of variable size with a size corresponding to the indicated message size received from the base station.

13. A method of operating a base station in a wireless telecommunications network comprising the base station and a terminal device, wherein the wireless telecommunications network supports a random access procedure comprising an exchange of random access procedure messages between the terminal device and the base station, wherein at least one of the random access procedure messages is a variable size uplink message; wherein the method comprises:
transmitting to the terminal device an instruction to perform the random access procedure, wherein the instruction to perform the random access procedure comprises an indication of a message size to be used by the terminal device for the variable size uplink message during the random access procedure; and
engaging in the random access procedure for the terminal device by exchanging random access procedure messages with the terminal device, including receiving the uplink message of variable size with a size corresponding to the indicated message size transmitted to the terminal device.

14. A base station for use in a wireless telecommunications network comprising the base station and a terminal device, wherein the wireless telecommunications network supports a random access procedure comprising an exchange of random access procedure messages between the terminal device and the base station, wherein at least one of the random access procedure messages is a variable size uplink message, wherein the base station comprises a controller unit and a transceiver unit configured such that the base station is operable to:

transmit to the terminal device an instruction to perform the random access procedure, wherein the instruction to perform the random access procedure comprises an indication of a message size to be used by the terminal device for the variable size uplink message during the random access procedure; and engage in the random access procedure for the terminal device by exchanging random access procedure messages with the terminal device, including receiving the uplink message of variable size with a size corresponding to the indicated message size transmitted to the terminal device.

15. Integrated circuitry for a base station for use in a wireless telecommunications network comprising the base station and a terminal device, wherein the wireless telecommunications network supports a random access procedure comprising an exchange of random access procedure messages between the terminal device and the base station, wherein at least one of the random access procedure messages is a variable size uplink message, wherein the integrated circuitry comprises a controller element and a transceiver element configured to operate together such that the base station is operable to:

transmit to the terminal device an instruction to perform the random access procedure, wherein the instruction to perform the random access procedure comprises an indication of a message size to be used by the terminal device for the variable size uplink message during the random access procedure; and engage in the random access procedure for the terminal device by exchanging random access procedure messages with the terminal device, including receiving the uplink message of variable size with a size corresponding to the indicated message size transmitted to the terminal device.

REFERENCES

[1] ETSI TS 122 368 V12.4.0 (2014-10)/3GPP TS 22.368 version 12.4.0 Release 12
[2] Holma H. and Toskala A, "LTE for UMTS OFDMA and SC-FDMA based radio access", John Wiley and Sons, 2009
[3] ETSI TS 136 213 V13.0.0 (2016-01)/3GPP TS 36.212 version 13.0.0 Release 13

What is claimed is:

1. A method of operating a base station in a wireless telecommunications network comprising the base station and a terminal device, wherein the wireless telecommunications network supports a random access procedure comprising an exchange of random access procedure messages between the terminal device and the base station, wherein at least one of the random access procedure messages is a variable size uplink message; wherein the method comprises:

transmitting to the terminal device an instruction to perform the random access procedure, wherein the instruction to perform the random access procedure comprises an indication of a message size to be used by the terminal device for the variable size uplink message during the random access procedure; and engaging in the random access procedure for the terminal device by exchanging random access procedure messages with the terminal device, including receiving the uplink message of variable size with a size corresponding to the indicated message size transmitted to the terminal device.

2. A base station for use in a wireless telecommunications network comprising the base station and a terminal device, wherein the wireless telecommunications network supports a random access procedure comprising an exchange of random access procedure messages between the terminal device and the base station, wherein at least one of the random access procedure messages is a variable size uplink message, wherein the base station comprises a controller unit and a transceiver unit configured such that the base station is operable to:

transmit to the terminal device an instruction to perform the random access procedure, wherein the instruction to perform the random access procedure comprises an indication of a message size to be used by the terminal device for the variable size uplink message during the random access procedure; and engage in the random access procedure for the terminal device by exchanging random access procedure messages with the terminal device, including receiving the uplink message of variable size with a size corresponding to the indicated message size transmitted to the terminal device.

3. Circuitry for a base station for use in a wireless telecommunications network comprising the base station and a terminal device, wherein the wireless telecommunications network supports a random access procedure comprising an exchange of random access procedure messages between the terminal device and the base station, wherein at least one of the random access procedure messages is a variable size uplink message, wherein the circuitry is configured to:

transmit to the terminal device an instruction to perform the random access procedure, wherein the instruction to perform the random access procedure comprises an indication of a message size to be used by the terminal device for the variable size uplink message during the random access procedure; and engage in the random access procedure for the terminal device by exchanging random access procedure messages with the terminal device, including receiving the uplink message of variable size with a size corresponding to the indicated message size transmitted to the terminal device.

4. The circuitry of claim 3, wherein the indication of the message size to be used by the terminal device for the variable size uplink message is conveyed explicitly in the instruction to perform the random access procedure.

5. The circuitry of claim 4, wherein the instruction to perform the random access procedure is associated with an indication of a random access preamble signature sequence to be used by the terminal device in an uplink message to initiate the random access procedure.

6. The circuitry of claim 5, wherein the indication of the message size to be used by the terminal device for the variable size uplink message is conveyed implicitly by the indicated random access preamble signature sequence.

7. The circuitry of claim 6, wherein different random access preamble signature sequences correspond with different sizes for the variable size message in accordance with a predefined association.

8. The circuitry of claim 3, wherein
the indication of the message size to be used by the terminal device for the variable size uplink message is conveyed implicitly by a context for performing the random access procedure.

9. The circuitry of claim 3, wherein
the indication of the message size to be used by the terminal device for the variable size uplink message is conveyed implicitly by information content included in the instruction to perform the random access procedure to convey other information.

10. The circuitry of claim 9, wherein
different information contents for the other information correspond with different sizes for the variable size message in accordance with a predefined association.

11. The circuitry of claim 3, wherein
the information content included in the instruction to perform the random access procedure to convey other information comprises an indication of a radio resource control configuration for the terminal device.

12. The circuitry of claim 11, wherein
different radio resource control configurations correspond with different sizes for the variable size message in accordance with a predefined association.

13. The circuitry of claim 3, wherein
the random access procedure messages comprise at least a first message, a second message, and a third message.

14. The circuitry of claim 13, wherein
the first message comprises an uplink message conveying a random access preamble signature sequence from the terminal device to the base station to initiate the random access procedure.

15. The circuitry of claim 14, wherein
the second message is a downlink message transmitted in response to the first message and conveying an indication of an allocation of uplink radio resources to be used by the terminal for transmitting the third message.

16. The circuitry of claim 15, wherein
the third message is the variable-size uplink message.

17. The circuitry of claim 3, wherein
the indication of a message size to be used by the terminal device for the variable size uplink message during the random access procedure comprises an indication of a transport block size (TBS) to be used for the variable size uplink message during the random access procedure.

18. The circuitry of claim 3, wherein
the instruction to perform the random access procedure transmitted from the base station while the terminal device is in a radio resource control connected mode of operation with the base station.

19. The circuitry of claim 3, wherein
the instruction to perform the random access procedure is transmitted in a physical downlink control channel (PDCCH).

20. The circuitry of claim 3, wherein
the circuitry includes at least one of a processor and a transceiver.

* * * * *